(12) United States Patent
Hoekstra et al.

(10) Patent No.: US 10,526,550 B2
(45) Date of Patent: Jan. 7, 2020

(54) PROCESS FOR DESULFURIZATION OF HYDROCARBONS

(71) Applicant: HALDOR TOPSØE A/S, Kgs. Lyngby (DK)

(72) Inventors: George Hoekstra, Wheaton, IL (US); Christian Ejersbo Strebel, Birkerød (DK)

(73) Assignee: HALDOR TOPSØE A/S KGS., Lyngby (DK)

( * ) Notice: Subject to any disclaimer, the term of this patent is extended or adjusted under 35 U.S.C. 154(b) by 0 days.

(21) Appl. No.: 16/092,582

(22) PCT Filed: Nov. 23, 2017

(86) PCT No.: PCT/EP2017/080272
§ 371 (c)(1),
(2) Date: Oct. 10, 2018

(87) PCT Pub. No.: WO2018/096064
PCT Pub. Date: May 31, 2018

(65) Prior Publication Data
US 2019/0127648 A1  May 2, 2019

Related U.S. Application Data

(60) Provisional application No. 62/425,770, filed on Nov. 23, 2016.

(30) Foreign Application Priority Data

Dec. 15, 2016 (EP) .................................. 16204338

(51) Int. Cl.
*C10G 65/06* (2006.01)
*B01J 21/04* (2006.01)
*B01J 23/882* (2006.01)

(52) U.S. Cl.
CPC .............. *C10G 65/06* (2013.01); *B01J 21/04* (2013.01); *B01J 23/882* (2013.01);
(Continued)

(58) Field of Classification Search
None
See application file for complete search history.

(56) References Cited

U.S. PATENT DOCUMENTS 6,495,030 B1 * 12/2002 Podrebarac ............ C10G 45/02
203/DIG. 6
2002/0153280 A1 * 10/2002 Didillon ................. B01J 23/755
208/57

(Continued)

FOREIGN PATENT DOCUMENTS

EP   1800748 A2   6/2007
EP   1831333 B1   1/2011
(Continued)

OTHER PUBLICATIONS

International Search Report (PCT/ISA/210) dated Mar. 6, 2018, by the European Patent Office as the International Searching Authority for International Application No. PCT/EP2017/080272.
(Continued)

*Primary Examiner* — Tam M Nguyen
(74) *Attorney, Agent, or Firm* — Buchanan Ingersoll & Rooney P.C.

(57) ABSTRACT

A process for hydrodesulfurizing an olefinic naphtha feedstock while retaining a substantial amount of the olefins, which feedstock has a T95 boiling point below 250° C. boils and contains at least 50 ppmw of organically bound sulfur and from 5% to 60% olefins, said process including (a) selective diolefin hydrogenation, under reaction conditions to convert at least 50% or 90% of the diolefins to paraffins or mono-olefins providing a pre-treated feedstock, (b)
(Continued)

hydrodesulfurizing the pre-treated feedstock in a sulfur removal stage in the presence of hydrogen and a hydrodesulfurization catalyst, at hydrodesulfurization reaction conditions to convert at least 50% of the organically bound sulfur to hydrogen sulfide and to produce a desulfurized product stream containing from 0 ppmw to 50 ppmw organically bound sulfur, with the associated benefit of such a process providing a lower octane loss, compared to a process with a lower gas to oil ratio.

9 Claims, 4 Drawing Sheets

(52) U.S. Cl.
CPC .................. *C10G 2300/104* (2013.01); *C10G 2300/1044* (2013.01); *C10G 2300/202* (2013.01); *C10G 2300/301* (2013.01)

(56) References Cited

U.S. PATENT DOCUMENTS

| | | | |
|---|---|---|---|
| 2004/0000506 A1* | 1/2004 | Podrebarac | C10G 45/02 208/211 |
| 2004/0007503 A1* | 1/2004 | Uzio | C10G 45/08 208/216 R |
| 2006/0096893 A1* | 5/2006 | De Almeida | C10G 45/02 208/210 |
| 2007/0173674 A1 | 7/2007 | Bouchy et al. | |
| 2007/0267326 A1* | 11/2007 | De Almeida | C10G 45/08 208/210 |
| 2008/0073250 A1* | 3/2008 | Bakshi | C10G 45/08 208/208 R |
| 2015/0129462 A1* | 5/2015 | Konda | C10G 65/06 208/97 |

FOREIGN PATENT DOCUMENTS

| | | |
|---|---|---|
| WO | 03029388 A1 | 4/2003 |
| WO | 2014031274 A1 | 2/2014 |

OTHER PUBLICATIONS

Search Report dated Jun. 20, 2017, by the European Patent Office for Application No. 16204338.4.

Written Opinion (PCT/ISA/237) dated Mar. 6, 2018, by the European Patent Office as the International Searching Authority for International Application No. PCT/EP2017/080272.

\* cited by examiner

PROCESS FOR DESULFURIZATION OF HYDROCARBONS

The present invention relates to a process for the selective hydrodesulfurization of naphtha streams containing sulfur and olefins. An olefinic naphtha stream is hydrodesulfurized at a high gas to oil ratio, resulting in effective hydrodesulfurization and maintenance of octane values.

The requirements to sulfur levels in gasoline have continually been increased, recently to below 10 ppmw. In general, this will require deep desulfurization of olefinic naphthas. Deep desulfurization of naphtha requires improved technology to reduce sulfur levels without the severe loss of octane that accompanies the undesirable saturation of olefins.

Hydrodesulfurization is a hydrotreating process for the removal of feed sulfur by conversion to hydrogen sulfide. Conversion is typically achieved by reaction of the feed with hydrogen over non-noble metal sulfided supported and unsupported catalysts, especially those of Co/Mo and Ni/Mo. Severe temperatures and pressures may be required to meet product quality specifications by conventional means.

Olefinic cracked naphthas and coker naphthas typically contain more than about 20 weight percent olefins. At least a portion of the olefins are hydrogenated during conventional hydrodesulfurization. Since olefins are relatively high octane number components, it is desirable to retain the olefins rather than to hydrogenate them to saturated compounds. Conventional hydrodesulfurization catalysts have both hydrogenation and desulfurization activity. Hydrodesulfurization of cracked naphthas using conventional naphtha desulfurization catalysts under conventional conditions required for sulfur removal, results in a significant loss of olefins through hydrogenation. This results in a lower grade fuel product that needs additional refining, such as isomerization, catalytic reforming, blending, etc., to produce higher octane fuels. This, of course, adds significantly to production costs.

Selective hydrodesulfurization involves removing sulfur while minimizing hydrogenation of olefins and octane reduction by various techniques, such as selective catalysts, separation of feedstocks, with individual treatments of fractions at specific process conditions, or both.

In regular hydrodesulfurization processes, the gas to oil ratio (GOR) is typically kept below 500 $Nm^3/m^3$ since it has been believed that higher GOR will push the reaction towards a higher hydrogenation of the olefins. In addition, there is little motivation to increase GOR, as a higher GOR will be related with additional cost due to a requirement for excess hydrogen circulation in the process, and an elevated consumption of hydrogen by reactions forming products without increased value.

It has however, now surprisingly been discovered that GOR above 500 $Nm^3/m^3$ contrary to expectation will have the effect of enabling a higher desulfurization with reduced loss of octane numbers.

The present invention is a process based on this observation, which is commercially attractive, since the value of naphtha is highly related to the octane number. Traditionally the octane number has been maintained by providing process modifications increasing the complexity of processes or by development of complex specific catalysts.

The gas to oil ratio shall in accordance with the terminology of the skilled person of refinery technology in the following be construed to mean the ratio between hydrogen containing gas and naphtha feedstock, as determined by the individual flows of the streams at the point where the hydrogen containing gas and the feedstock are mixed. In the present text the term GOR may be used as an abbreviation for the gas to oil ratio. The two terms shall be construed as fully equivalent. The unit for GOR is given as $Nm^3/m^3$, which. The unit $Nm^3$ shall be understood as "normal" m3, i.e. the amount of gas taken up this volume at 0° C. and 1 atmosphere and the flow of oil ($m^3$) shall be understood as the volumetric flow at standard conditions, typically at 60° F. and 1 atmosphere.

The hydrogen to oil ratio shall similarly in the following be construed to mean the ratio between the hydrogen share of the gas and the naphtha feedstock, as determined by the individual flows of the streams at the point where the hydrogen containing gas and the feedstock are mixed. In the present text the term H2OR may be used as an abbreviation for the hydrogen to oil ratio. The two terms shall be construed as fully equivalent. The unit for H2OR is given as $Nm^3/m^3$, which. The unit $Nm^3$ shall be understood as "normal" m3, i.e. the amount of gas taken up this volume at 0° C. and 1 atmosphere and the flow of oil ($m^3$) shall be understood as the volumetric flow at standard conditions, typically at 60° F. and 1 atmosphere.

The pressure and temperature shall in accordance with the terminology of the skilled person of refinery technology in the following be construed as the pressure and temperature respectively at the inlet of a reactor.

Similarly the hydrogen partial pressure shall be construed as the partial pressure of hydrogen at the inlet of the reactor.

The space velocity shall in accordance with the terminology of the skilled person of refinery technology in the following be construed as the LHSV (liquid hourly space velocity) over a single catalytically active material unless otherwise indicated.

Where concentrations are stated in vol % or ppmv this shall be understood as volume/volume % and volume/volume parts per million.

The initial boiling point (IBP), the final boiling point (FBP) and the temperatures corresponding to recovered amounts of sample, shall be understood in accordance with the ASTM D86 standard. $T_5$, $T_{10}$, $T_{50}$ and $T_{95}$ boiling points shall accordingly be understood as the distillation temperatures where 5 vol %, 10 vol %, 50 vol % and 95 vol % respectively have been recovered.

The research octane number (RON) shall be understood as the octane number measured in accordance with ASTM D2699.

Olefins shall in accordance with the IUPAC definition and the language of the skilled person be understood as acyclic and cyclic hydrocarbons having one or more carbon-carbon double bonds.

Di-olefins shall similarly be understood as acyclic and cyclic hydrocarbons having two or more carbon-carbon double bonds.

The severity of reaction conditions shall be understood as the extent to which a given reaction will take place. Hydrodesulfurization severity, shall be understood as being increased if one or more physical or chemical conditions are changed in a way having the consequence that the degree of hydrodesulfurization is increased.

Where concentrations are stated in wt % or ppmw this shall be understood as weight/weight % and weight/weight parts per million.

Where an amount of sulfur is specified, this shall construed as the wt % of atomic sulfur, relative to the total stream.

One alternative refinery process for treating an olefinic naphtha feedstock relates to a process for hydrodesulfurizing an olefinic naphtha feedstock while retaining a substantial amount of the olefins, which feedstock has a $T_{95}$ boiling point below 250° C. boils and contains at least 50 ppmw of organically bound sulfur and from 5% to 60% olefins, said process comprising hydrodesulfurizing the feedstock in a sulfur removal stage in the presence of hydrogen and a hydrodesulfurization catalyst, at hydrodesulfurization reaction conditions including a temperature from 200° C. to 350° C., a pressure of 2 bar, 5 bar or 10 bar to 40 bar or 50 bar, and gas to oil ratio of 750 $Nm^3/m^3$, 1000 $Nm^3/m^3$, 1100 $Nm^3/m^3$a or 1200 $Nm^3/m^3$ to 1500 $Nm^3/m^3$, 2000 $Nm^3/m^3$ or 2500 $Nm^3/m^3$, to convert at least 50% of the organically bound sulfur to hydrogen sulfide and to produce a desulfurized product stream containing from 0 ppmw, 0.1 ppmw or 1 ppmw to 5 ppmw, 8 ppmw, 10 ppmw or 50 ppmw organically bound sulfur, with the associated benefit of such a process providing a lower octane loss, compared to a process with similar conversion of organic sulfur with a lower gas to oil ratio.

In a variant of this alternative process the selective diolefin hydrogenation reaction conditions involves a temperature from 100° C. to 150° C., a pressure of 5 bar to 40 bar or 50 bar, and a gas to oil ratio of 250 $Nm^3/m^3$ to 2500 $Nm^3/m^3$ to convert at least 90% of the diolefins to paraffins or mono-olefins, with the associated benefit of such a process not requiring separate hydrogen addition in the diolefin hydrogenation and hydrodesulfurizing steps.

A broad aspect of the present disclosure relates to a process for hydrodesulfurizing an olefinic naphtha feedstock while retaining a substantial amount of the olefins, which feedstock has a $T_{95}$ boiling point below 250° C. boils and contains at least 50 ppmw of organically bound sulfur and from 5% to 60% olefins, said process comprising (a) selective diolefin hydrogenation, under reaction conditions involving a temperature from 100° C. to 200° C., a pressure of 5 bar to 40 bar or 50 bar, and a gas to oil ratio of 2 $Nm^3/m^3$ or 4 $Nm^3/m^3$ to 5 $Nm^3/m^3$, 10 $Nm^3/m^3$ or 25 $Nm^3/m^3$ to convert at least 50% or 90% of the diolefins to paraffins or mono-olefins providing a pre-treated feedstock, (b) hydrodesulfurizing the pre-treated feedstock in a sulfur removal stage in the presence of hydrogen and a hydrodesulfurization catalyst, at hydrodesulfurization reaction conditions including a temperature from 200° C. to 350° C., a pressure of 5 bar to 40 bar or 50 bar, and gas to oil ratio of 750 $Nm^3/m^3$, 1000 $Nm^3/m^3$, 1100 $Nm^3/m^3$a or 1200 $Nm^3/m^3$ to 1500 $Nm^3/m^3$, 2000 $Nm^3/m^3$ or 2500 $Nm^3/m^3$, to convert at least 50% of the organically bound sulfur to hydrogen sulfide and to produce a desulfurized product stream containing from 0 ppmw, 0.1 ppmw or 1 ppmw to 5 ppmw, 8 ppmw, 10 ppmw or 50 ppmw organically bound sulfur, with the associated benefit of such a process providing a lower octane loss, compared to a process with similar conversion of organic sulfur with a lower gas to oil ratio. In addition the pre-treatment at low gas to oil ratio, will reduce the risk of polymerization of diolefins in the process. In addition olefins and mercaptans will react to convert low-boiling mercaptans to higher boiling sulfides, which has the potential effect of providing a light naphtha fraction comprising olefins and little or no sulfur and a heavy naphtha fraction comprising few olefins and the majority of sulfur. This difference in characteristics between light naphtha fraction and heavy naphtha fraction may be employed in specific treatment of the two fractions.

In a further embodiment the process further comprises the steps of c) separating the feedstock in at least a heavy naphtha stream and a light naphtha stream according to boiling point d) directing said heavy naphtha stream as the feedstock of said hydrodesulfurizing step, providing a desulfurized product stream e) optionally directing the light naphtha stream as the feedstock to a further sulfur removal stage, providing a light desulfurized naphtha stream f) combining said desulfurized product stream and either said light naphtha stream or said light desulfurized naphtha stream to form a final product stream, with the associated benefit of such a process having a lower octane loss compared to a similar process without separation of the feedstock.

In a further embodiment the hydrodesulfurization reaction conditions involves a hydrogen pressure in the range 2 bar to 5 bar, with the associated benefit of the low hydrogen pressure range decreasing the tendency to saturation of olefins, while the elevated gas to oil ratio ensures shifts hydrodesulfurization towards hydrogen sulfide and sulfur-free hydrocarbons.

In a further embodiment said hydrodesulfurization catalyst comprises 0.5% or 1% to 5% cobalt and/or nickel and 3% to 20% molybdenum and/or tungsten, on a refractory support, with the associated benefit of such a catalyst being cost effective for hydrodesulfurization.

In a further embodiment said hydrodesulfurization catalyst comprises 0.5% or 1% to 5% cobalt and 3% to 20% molybdenum with the associated benefit of such a catalyst being cost effective for hydrodesulfurization and having limited activity in olefin saturation.

In a further embodiment said refractory support comprises alumina, silica, spinel or silica-alumina, with the associated benefit of such a support being highly robust. Alumina and silica shall be construed as materials of synthetic or natural origin being dominated by the oxides of aluminum and silicium. Alumina-silica shall be construed as a mixture, in any ratio, on any level down to atomic level of these oxides. Spinel shall be construed as an oxidic material comprising magnesium and aluminum in a common crystal structure.

In a further embodiment said step (b) comprises the substeps (x) directing said heavy naphtha stream as the feedstock of a first hydrodesulfurizing step, providing a desulfurized heavy product stream (y) optionally separating the desulfurized heavy product stream in a at least a desulfurized heavy naphtha stream and a gas stream, (z) further desulfurizing the heavy desulfurized naphtha product stream, providing the desulfurized product stream wherein the conditions and catalytically active material of steps (x) and (z) may be similar or different with the associated benefit tailoring the catalytically active material of steps (x) and (z) to the relevant requirements for conversion of sulfur, and with the associated benefit of removing hydrogen sulfide which may interfere with the hydrodesulfurization of step (z).

In a further embodiment said step (x) converts at least 75,%, 80% or 85% of the organically bound sulfur to $H_2S$, with the associated benefit of the high GOR of the process allowing such a severe HDS step, while avoiding excessive saturation of olefins.

In a further embodiment said step (y) is present and involves the steps (p) separating the desulfurized heavy product stream in a at least a desulfurized heavy naphtha stream, desulfurized intermediate naphtha stream and a gas stream, and one or both of the steps (q) further desulfurizing the intermediate desulfurized naphtha product stream, providing the intermediate desulfurized product stream and (r) combining two or more of the intermediate desulfurized product stream, the heavy desulfurized product stream, the light naphtha stream and the light desulfurized naphtha stream to form a final product stream, with the associated benefit of providing even more possibility to fine tune the materials and conditions of the process.

In a further embodiment the process further comprises a step of selective diolefin hydrogenation prior to said hydrodesulfurizing step, with the associated benefit of reducing the risk of polymerization of diolefins in the process and of reacting olefins and mercaptans to convert low-boiling mercaptans to higher boiling sulfides. The reaction between olefins and mercaptans has the effect of providing a light naphtha fraction comprising olefins and little or no sulfur and a heavy naphtha fraction comprising few olefins and the majority of sulfur. Such two fractions may be separated and treatedly individually.

The rate of a chemical process is controlled by chemical kinetics. Typically, reaction rates increase with increased temperature, increased reactant concentration, decreased product concentration and decreased space velocities (i.e. increased residence times), but the relations may be more complex than expected, due to the nature of reaction mechanisms on the microscopic level. Especially in refinery processes, increasing the factors which increase reaction rates will be called increased severity of the process.

Hydrogenation processes are often employed in the conversion of hydrocarbons, e.g. for the removal of sulfur by hydrodesulfurization (HDS). The severity of hydrogenation is typically increased by increasing temperature, pressure, hydrogen partial pressure, the gas to oil ratio (GOR), the hydrogen to oil ratio (H2OR) or decreasing the space velocity.

A common intermediate product in refineries is naphtha withdrawn from a fluid catalytic cracker, which is suitable for use as gasoline. The amount of sulfur in this FCC naphtha is typically too high to be included in final gasoline product, and the sulfur is often reduced by hydrotreatment, but at the same time it is desired that the amount of olefins is maintained, as removal of these would lead to a reduced octane number of the final gasoline product. As desulfurization as well as olefin saturation are hydrogenation processes the immediate expectation is that increasing the hydrogenation severity to obtain a high extent of HDS will be associated with a high sacrifice of octane number due to olefin saturation. A further aspect of FCC naphtha post-treat is that the presence of di-olefins is undesired, as diolefins, which may be present in a concentration from 0.1%, 0.5% or 1% to around 5%, may polymerize and form solid products which will block the reactor.

The strategy for balancing a high diolefin saturation, a high HDS activity and a low olefin saturation has often been based on specific process conditions in combination with the choice of selective catalysts. For the diolefin-hydrogenation a nickel-molybdenum catalyst operating at low GOR and low temperature has been preferred, since the less severe conditions will not result in high hydrogenation of mono-olefins. EP 0 725 126 propose to split the FCC naphtha to be desulfurized in a light and a heavy naphtha stream, and treat these differently—e.g. by only hydrotreating the heavy naphtha stream, which will have the highest amount of sulfur, or by hydrotreating the heavy naphtha stream in two steps with or without intermediate separation. Often the first hydrotreatment step is carried out in the presence of a cobalt/molybdenum catalyst, which is more active in HDS than in olefin saturation.

Recent environmental standards require the sulfur content to be as low as 10 ppm in gasoline. To obtain this for a feed with 1000 ppm sulfur as much as 99% HDS will be required. It is well known that this may be obtained by increasing the severity of the HDS process by increasing the temperature or pressure. This increase in temperature or pressure will however have the drawback of also increasing the olefin saturation, such that the octane number and thus the gasoline value is reduced.

Similarly, the decrease of space velocity may also result in increased HDS, but also in this situation a sacrifice of octane number is observed.

According to the prior art, the GOR for HDS of FCC naphtha has typically been 300 $Nm^3/m^3$ to 500 $Nm^3/m^3$, but studies of the effect of varying GOR have not been made. Increasing GOR has however been considered an increase of hydrotreatment severity, and therefore a common expectation has been that increased GOR would result in increased rates of other hydrogenation processes. The experiments in the present document, evidence that increasing GOR above 500 $Nm^3/m^3$ results in increased HDS without increasing olefin saturation; on the contrary a reduction in olefin saturation is observed. Without being bound by theory it is believed that the high GOR may protect some olefins or alternatively that new olefins may be formed which have a strong contribution to the octane number. This surprising experimental observation may be implemented in a novel and inventive process, involving operation with pre-treatment at low GOR, such as 2 $Nm^3/m^3$ or 4 $Nm^3/m^3$ to 5 $Nm^3/m^3$, 10 $Nm^3/m^3$ or 25 $Nm^3/m^3$, in combination with a hydrodesulfurization at unusually high GOR, such as above 500 $Nm^3/m^3$, 750 $Nm^3/m^3$, 1100 $Nm^3/m^3$, 1200 $Nm^3/m^3$ or even 1500 $Nm^3/m^3$.

A further possible theory explaining the effect of the high GOR is that the high GOR provides a dilution effect, such that the released $H_2S$ is diluted by the increase gas flow, and thus less available for contributing to the dynamic equilibrium between e.g. mercaptans and $H_2S$ and olefins. Therefore the high GOR may be obtained the gas phase comprising an amount of hydrogen in combination with a gas not partaking in the hydrogenation reaction, such as nitrogen or methane.

Reducing sulfur content while having low or no reduction of octane number, by a high GOR has the benefit that complex process layouts may be avoided or that it is made possible to obtain very low sulfur levels in combination with satisfactory octane numbers, which would otherwise be hard to obtain. It may however also be found beneficial to combine a process with a high GOR with the existing process designs, such as an initial hydrogenation of diolefins, a separation of heavy and light naphtha streams, and treatment of one or both of these streams, in one or more steps. Some or all of the process steps involving hydrodesulfurisation may be carried out at increased GOR in accordance with the present disclosure.

The hydrogenation of diolefins is preferably carried out at moderate conditions. The reason is that the hydrogenation of the first double bond in diolefins is readily carried at low temperature, and by limiting the temperature the second double bond may be protected. Therefore, the GOR are kept very low, typically below 25 $Nm^3/m^3$, 10 $Nm^3/m^3$ or even 5 $Nm^3/m^3$, but also temperature is kept low, e.g. around 100° C.-200° C. The GOR must however be sufficient for the desired saturation of diolefins present.

FIGURES

Figure 1:
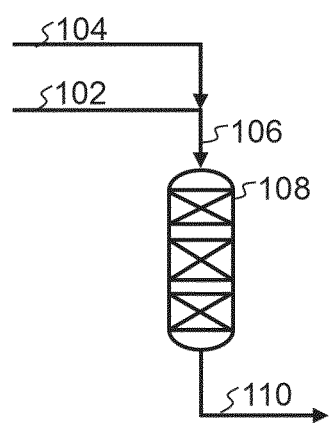
FIG. 1 shows a simple process, implementing the present disclosure.

102 Hydrocarbon feedstock
104 Stream of hydrogen containing gas
106 Combined feedstock
108 Material catalytically active in hydrodesulfurization
110 Desulfurized naphtha stream
202 Di-olefinic hydrocarbon feedstock
204 Hydrogen containing gas
206 Di-olefinic feedstock reaction mixture
208 Material catalytically active in diolefin saturation
210 Intermediate product
212 Separator
214 Light naphtha stream
216 Heavy naphtha stream
218 Hydrogen containing gas
220 Heavy naphtha reaction mixture
222 First material catalytically active in hydrodesulfurization
222 Material catalytically active in hydrodesulfurization
224 Partly desulfurized heavy naphtha
226 Further catalytically active material
228 Desulfurized heavy naphtha
230 Desulfurized naphtha product FIG. 1 shows a process for removing organically bound sulfur from hydrocarbons. The process involves combining a hydrocarbon feedstock 102 containing organically bound sulfur and olefins with a stream of hydrogen containing gas 104 such that the ratio of hydrogen containing gas to feedstock is at least 750 Nm$^3$/m$^3$. The combined feedstock 106 is directed to contact a material catalytically active in hydrodesulfurization 108, such as 1% cobalt and 3% molybdenum, on an alumina support, at a temperature around 250° C. A desulfurized naphtha stream 110 is withdrawn from the catalytically active material.

In a further embodiment the catalytically active material may have a different composition such as 1% to 5% cobalt and 3% to 20% molybdenum or tungsten, on a refractory support, which may be alumina, silica, spinel or silica-alumina.

In a further embodiment the hydrogen containing gas may comprise significant amounts of other gases, e.g. more than 25%, 50% or even 75% nitrogen, methane or ethane.

Figure 2:
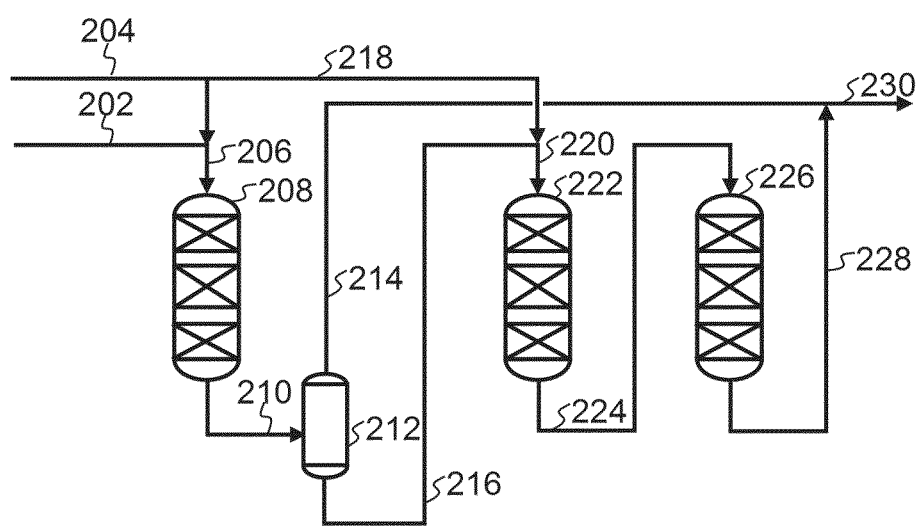
FIG. 2 shows an implementation of the present disclosure in a process involving pre-treatment and separation.

FIG. 2 shows a process for removing organically bound sulfur from hydrocarbons comprising di-olefins. The process involves combining a di-olefinic hydrocarbon feedstock 202 containing organically bound sulfur, olefins and diolefins with a stream of hydrogen containing gas 204 such that the ratio of hydrogen containing gas to feedstock is around 5-10 Nm$^3$/m$^3$ providing a di-olefinic feedstock reaction mixture 206. The di-olefinic feedstock reaction mixture 206 is directed to contact a material catalytically active in diolefin saturation 208, such as 2% nickel or cobalt and 7% molybdenum or tungsten, on an alumina support, at a temperature around 100-200° C., to provide an intermediate product 210 comprising less than 0.1% or 0.3% di-olefins. Under such mild conditions, it is considered that the lighter sulfur components of the di-olefinic hydrocarbon feedstock do not react to release organic sulfur as H$_2$S, but instead they may undergo recombination reactions with olefins to form heavier sulfides. The intermediate product 210 is directed to a separator 212, from which a light naphtha stream 214 and a heavy naphtha stream 216 are withdrawn. The heavy naphtha stream 216 is combined with a stream of hydrogen containing gas 218 such that the ratio of hydrogen containing gas to feedstock in the resulting heavy naphtha reaction mixture 220 is at least 750 Nm$^3$/m$^3$ and directed to contact a first material catalytically active in hydrodesulfurization 222, such as 1% cobalt and 3% molybdenum, on an alumina support, at a temperature around 250° C., providing a partly desulfurized heavy naphtha 224. The partly desulfurized heavy naphtha 224 may optionally be directed to a further catalytically active material 226 such as 12% nickel on an alumina support, typically operating at a temperature higher than the first material catalytically active in hydrodesulfurization 222, such as 300° C. to 360° C., providing a desulfurized heavy naphtha 228. The desulfurized heavy naphtha 228 is then combined with the light naphtha stream 214 to provide a desulfurized naphtha product 230. In FIG. 1 and FIG. 2 the temperature control of the reactions are not shown, but since the HDS reactions are exothermic, it is typical to add cold hydrogen containing gas or cold recycled product to maintain a low temperature increase. If the GOR is increased the requirement for using product recycle may be reduced, as more quench gas will be available.

In a further embodiment the light naphtha may also be desulfurized by contact with a material catalytically active in hydrotreatment, but typically at less severe conditions than the heavy stream(s).

In a further embodiment the partly desulfurized heavy naphtha may be directed to a separator to provide the heavy sulfurized naphtha fraction contacting the third catalytically active material and an intermediate naphtha fraction which may either be treated by contact with a further catalytically active material or be combined into the desulfurized naphtha product.

EXAMPLES

A feedstock of commercial, heavy catalyst cracked naphtha boiling between 60 and 200° C. was directed to hydrodesulfurization in an isothermal downflow pilot plant reactor. The feedstock is characterized in Table 1. The hydrodesulfurization conditions in the reactor were temperatures from 200 to 280° C., a 100% hydrogen treat gas to feedstock ratio (GOR) of 250 to 1400 Nm$^3$/m$^3$, an inlet pressure of 20 barg and a liquid hourly space velocity (LHSV) of 2.5 1/hr (v/v/hr). The reactor effluent was cooled to ca. −5° C. to condense the treated naphtha product, which was separated from a remaining gas phase comprising H$_2$S and unreacted H$_2$, and subsequently stripped using N$_2$ to remove any dissolved H$_2$S from the product. The catalyst used was a hydrodesulfurization catalyst comprising 1.1 wt % Co and 3.2 wt % Mo on alumina support. The catalyst was a 1/20 inch trilobe size.

Example 1

In Example 1, according to the present disclosure, the HDS process was carried out at a temperature of 250° C. and varying GOR to obtain HDS from 82-94%. From the examples it is seen that when increasing the HDS by increasing GOR, the olefin saturation is constant or even decreased.

The experimental results are shown in Table 2.

Example 2

In Example 2, according to the prior art, the HDS process was carried out at varying temperatures and a constant GOR of 502 Nm$^3$/m$^3$ to obtain HDS from 41-97%. From the examples it is seen that when increasing the HDS by increasing temperature, the olefin saturation is increased significantly, especially at temperatures above 240° C.

The experimental results are shown in Table 3.

Figure 3:
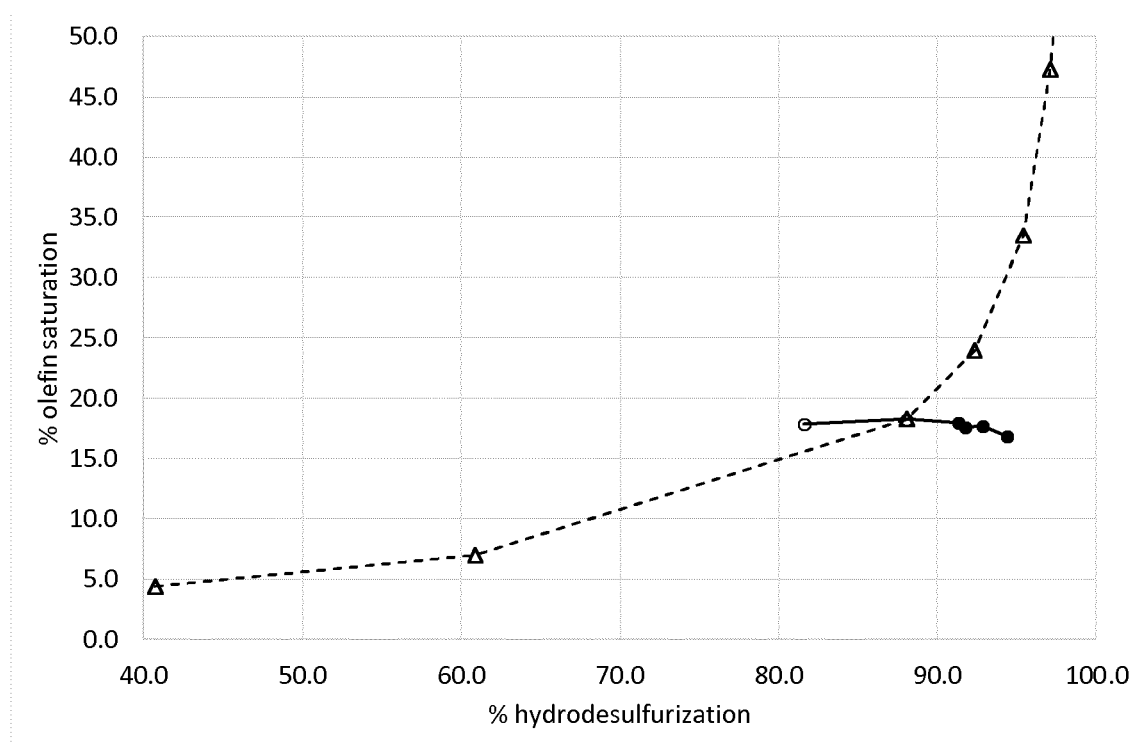
FIG. 3 shows experimental results documenting the effect of increased GOR upon the loss of olefins and the extent of HDS.

FIG. 3 compare the data according to Example 1 and Example 2. The dashed line indicates the relation between desulfurization and olefin saturation when the process severity is controlled by variation of the process temperature and the solid line shows the relation between desulfurization and olefin saturation when the process severity is controlled by variation of the GOR. It is clear that the undesired olefin saturation is dramatically increasing with increasing temperature, but also that olefin saturation is unchanged or even decreased with increasing GOR. Therefore, according to the present invention it is possible to obtain a significant improvement in HDS without sacrifice of octane number, if the gas to oil ratio of the reaction mixture is chosen to be above the range normally employed.

Example 3 and Example 4

A further feedstock of commercial, heavy catalyst cracked naphtha boiling between 60 and 200° C. was directed to hydrodesulfurization in an isothermal downflow pilot plant reactor. The feedstock is characterized in Table 4. The hydrodesulfurization conditions in the reactor were temperatures of 235° C., a 100% hydrogen treat gas to feedstock ratio (GOR) of 250 to 1500 Nm$^3$/m$^3$, an inlet pressure of 20 barg and a liquid hourly space velocity (LHSV) of 2.5 1/hr (v/v/hr). The reactor effluent was cooled to ca. −5° C. to condense the treated naphtha product, which was separated from a remaining gas phase comprising H$_2$S and unreacted H$_2$, and subsequently stripped using N$_2$ to remove any dissolved H$_2$S from the product. The catalyst used was a hydrodesulfurization catalyst comprising 1.1 wt % Co and 3.2 wt % Mo on alumina support. The catalyst was a 1/10 inch assymmetric quadlobe size.

Example 3

In Example 3, according to the present disclosure, the HDS process was carried out at a temperature of 235° C. and varying GOR from 250 Nm$^3$/m$^3$ to 150 Nm$^3$/m$^3$ to obtain HDS from 77-93%. The experiment confirmed the trend of increasing HDS, with minimal sacrifice of olefins by increasing the GOR.

Example 4

In Example 4, according to the present disclosure, the HDS process was carried out at a temperature of 235° C., a GOR of 1000 Nm$^3$/m$^3$ and a H2OR (H2:oil ratio) from 250 to 1000 Nm$^3$/m$^3$ (balanced with methane) to obtain HDS from 75-92%, in order to evaluate the influence of hydrogen partial pressure on HDS and olefin saturation, having a constant GOR and varying H2OR (and thus hydrogen partial pressure).

These experiments showed that for the same GOR, decreasing availability of hydrogen partial pressure had little effect on HDS, but olefin saturation was significantly reduced, relative to similar process conditions with higher hydrogen partial pressure.

Figure 4:
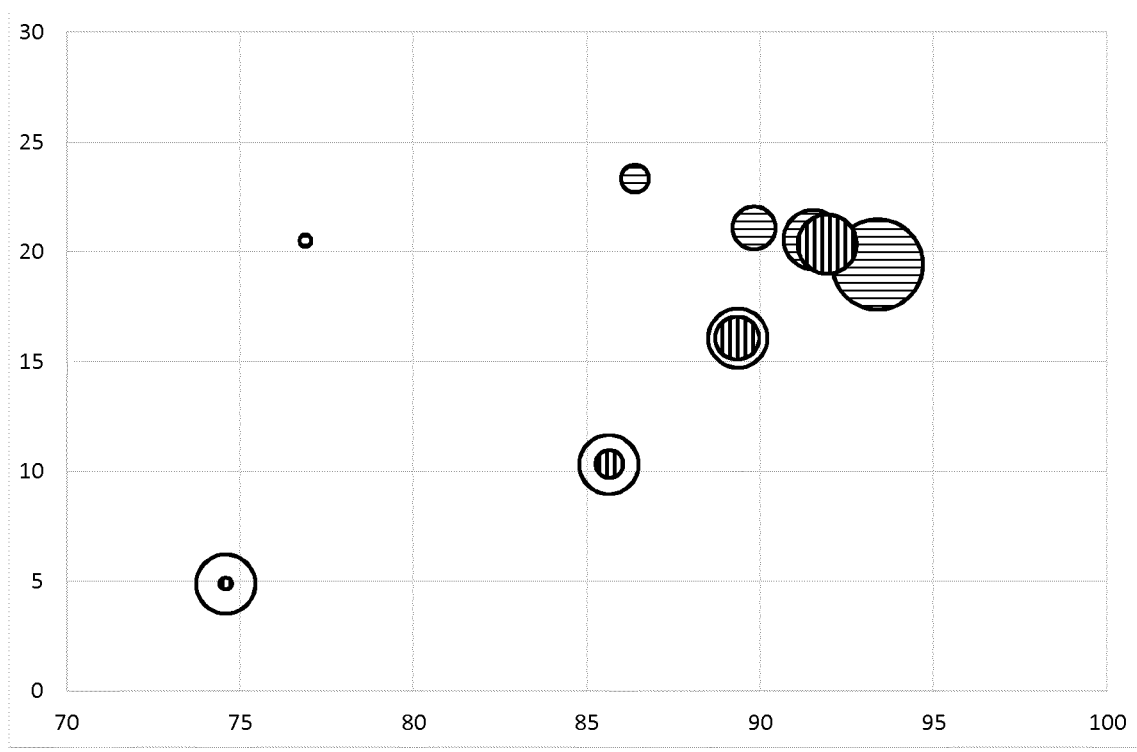
FIG. 4 shows experimental results documenting the effect of increased GOR and H2OR upon the loss of olefins and the extent of HDS.

Example 3 and Example 4 are compared in FIG. 4, which shows the experiments as circles, with the diameter proportional to the GOR. Example 3, where only GOR was varied is indicated as circles with horizontal lines. The experiments of Example 4, where GOR was constant, and the H2OR was varied are indicated by pairs of concentric circles. The inner circles with vertical lines shows the H2OR, and the outer open circles shows the total GOR.

The four examples confirm that the GOR parameter and the amount of hydrogen in the gas are important parameters for controlling the selectivity of hydrodesulfurization with respect to olefin saturation in post-treatment of FCC naphtha.

TABLE 1

| | Feedstock | |
|---|---|---|
| Property | Method of Analysis | |
| Sulfur | ASTM D 4294 | 250 ppmw |
| SG 60/60° F. | ASTM D 4052 | 0.7605 |
| Olefin | ASTM D 6839 | 35 w % |
| RON | ASTM D 2699 | 89.8 |
| Boiling point | ASTM D 7213 | |
| IBP | | 37° C. |
| 5% | | 62° C. |
| 10% | | 71° C. |
| 50% | | 117° C. |
| 95% | | 173° C. |
| FBP | | 201° C. |

TABLE 2

| Temperature [° C.] | GOR | % HDS | % Olefin Saturation |
|---|---|---|---|
| 230 | 252 | 81.6 | 17.8 |
| 230 | 502 | 88.1 | 18.2 |
| 230 | 752 | 91.3 | 17.9 |
| 230 | 904 | 91.5 | 17.5 |
| 230 | 1104 | 92.2 | 17.6 |
| 230 | 1405 | 94.4 | 16.8 |

TABLE 3

| Temperature [° C.] | GOR | % HDS | % Olefin Saturation |
|---|---|---|---|
| 200 | 502 | 40.8 | 4.3 |
| 210 | 502 | 60.9 | 6.9 |
| 240 | 502 | 88.1 | 23.9 |
| 250 | 502 | 95.5 | 33.5 |
| 260 | 502 | 97.1 | 47.2 |
| 280 | 502 | 99.1 | 74.8 |

TABLE 4

| | Feedstock | |
|---|---|---|
| Property | Method of Analysis | |
| Sulfur | ASTM D 4294 | 249 ppmw |
| SG 60/60° F. | ASTM D 4052 | 0.7517 |
| Olefin | ASTM D 6839 | 35 w % |
| RON | ASTM D 2699 | 90.7 |
| Boiling point | ASTM D 6729 | |
| IBP | | −3.4° C. |

TABLE 4-continued

| Property | Method of Analysis | Feedstock |
|---|---|---|
| 10 wt % | | 49° C. |
| 20 wt % | | 69° C. |
| 50 wt % | | 115° C. |
| 90 wt % | | 166° C. |
| FBP | | 189° C. |

TABLE 5

| Temperature [° C.] | Gas/Oil | $H_2$/Oil | % HDS | % Olefin Saturation |
|---|---|---|---|---|
| 235 | 250 | 250 | 76.9 | 20.5 |
| 235 | 500 | 500 | 86.4 | 23.3 |
| 235 | 750 | 750 | 89.8 | 21.1 |
| 235 | 1003 | 1003 | 91.5 | 20.6 |
| 235 | 1501 | 1501 | 93.4 | 19.4 |

TABLE 6

| Temperature [° C.] | Gas/Oil | $H_2$/Oil | % HDS | % Olefin Saturation |
|---|---|---|---|---|
| 235 | 1002 | 251 | 74.6 | 4.9 |
| 235 | 1000 | 500 | 85.7 | 10.3 |
| 235 | 1000 | 750 | 89.4 | 16.1 |
| 235 | 1000 | 1000 | 91.9 | 20.3 |

The invention claimed is:

1. A process for hydrodesulfurizing an olefinic naphtha feedstock while retaining a substantial amount of the olefins, which feedstock has a $T_{95}$ boiling point below 250° C. and contains at least 50 ppmw of organically bound sulfur and from 5% to 60% olefins, said process comprising:
  (a) selective diolefin hydrogenation, under reaction conditions involving a temperature from 100° C. to 200° C., a pressure of 5 bar to 50 bar, and a gas to oil ratio of 2 $Nm^3/m^3$ to 25 $Nm^3/m^3$ to convert at least 90% of the diolefins to alkanes or mono-olefins providing a pre-treated feedstock, and
  (b) hydrodesulfurizing the pre-treated feedstock in a sulfur removal stage in the presence of hydrogen and a hydrodesulfurization catalyst, at hydrodesulfurization reaction conditions including a temperature from 200° C. to 350° C., a pressure of 2 bar to 50 bar, and gas to oil ratio of 750 $Nm^3/m^3$ to 2500 $Nm^3/m^3$, to convert at least 50% of the organically bound sulfur to hydrogen sulfide and to produce a desulfurized product stream containing from 0 ppmw to 50 ppmw organically bound sulfur.

2. A process according to claim 1 in which the hydrodesulfurization reaction conditions involves a hydrogen pressure in the range 2 bar to 5 bar.

3. A process according to claim 2 further comprising the steps of
  (c) separating the pre-treated feedstock in at least a heavy naphtha stream and a light naphtha stream according to boiling point(d) directing said heavy naphtha stream as the feedstock of said hydrodesulfurizing step, providing a desulfurized product stream,
  (e) optionally directing the light naphtha stream as the feedstock to a further sulfur removal stage, providing a light desulfurized naphtha stream, and
  (f) combining said desulfurized product stream and either said light naphtha stream or said light desulfurized naphtha stream to form a final product stream.

4. A process according to claim 1 in which said hydrodesulfurization catalyst comprises 0.5% to 5% cobalt and/or nickel and 3% to 20% molybdenum and/or tungsten, on a refractory support.

5. A process according to claim 4 in which said hydrodesulfurization catalyst comprises 0.5% to 5% cobalt and 3% to 20% molybdenum.

6. A process according to claim 4 in which refractory said support comprises one or more of alumina, silica, spinel or silica-alumina.

7. A process according to claim 2, wherein said step (b) comprises the substeps
  (x) directing said heavy naphtha stream as the feedstock of a first hydrodesulfurizing step, providing a desulfurized heavy product stream,
  (y) optionally separating the desulfurized heavy product stream in a at least a desulfurized heavy naphtha stream and a gas stream, and
  (z) further desulfurizing the heavy desulfurized naphtha product stream, providing the desulfurized product stream,
  wherein the conditions and catalytically active material of steps (x) and (z) may be similar or different.

8. A process according to claim 7, wherein said step (x) converts at least 75% of the organically bound sulfur to $H_2S$.

9. A process according to claim 8, wherein said step (y) is present and involves the steps
  (p) separating the desulfurized heavy product stream in a at least a desulfurized heavy naphtha stream, desulfurized intermediate naphtha stream and a gas stream, and one or both of the steps,
  (q) further desulfurizing the intermediate desulfurized naphtha product stream, providing the intermediate desulfurized product stream, and
  (r) combining two or more of the intermediate desulfurized product stream, the heavy desulfurized product stream, said light naphtha stream and said light desulfurized naphtha stream to form a final product stream.

* * * * *